United States Patent [19]

Saito

[11] Patent Number: 4,796,954
[45] Date of Patent: Jan. 10, 1989

[54] SEAT BACK REAR STRUCTURE

[75] Inventor: Tetsuo Saito, Tokyo, Japan

[73] Assignee: Tachi-S Ltd., Akishima, Japan

[21] Appl. No.: 14,816

[22] Filed: Feb. 13, 1987

[51] Int. Cl.⁴ ............................................. A47C 7/18
[52] U.S. Cl. ................................. 297/452; 297/460; 297/DIG. 1
[58] Field of Search ............... 297/DIG. 1, DIG. 2, 297/452, 459, 460, 218, 219

[56] References Cited

U.S. PATENT DOCUMENTS

| 3,874,731 | 4/1975 | Jordan | 297/452 |
| 4,365,840 | 12/1982 | Kehl et al. | 297/460 X |
| 4,615,561 | 10/1986 | Nomura | 297/460 X |

FOREIGN PATENT DOCUMENTS

| 68211 | 1/1983 | European Pat. Off. | 297/460 |
| 1914725 | 10/1970 | Fed. Rep. of Germany | 297/452 |
| 2262595 | 7/1974 | Fed. Rep. of Germany | 297/460 |
| 2944054 | 5/1981 | Fed. Rep. of Germany | 297/452 |
| 1132647 | 3/1957 | France | 297/460 |
| 102628 | 6/1984 | Japan | 297/219 |

Primary Examiner—Kenneth J. Dorner
Assistant Examiner—James R. Brittan
Attorney, Agent, or Firm—Oldham & Oldham

[57] ABSTRACT

A rear structure of a seat back for an automotive seat is disclosed. In order to increase the depth dimension of a seat cushion, a rearwardly curved reinforcing rod is welded to the lower portion of an inverted U-shaped frame forming the seat, and the shape holding portions of a cushion member thicker than the turned-back portions thereof covering the upper portion of the frame are applied against the frame with the rod welded thereto. The outer surfaces of the shape holding portions are arranged to form the same plane with the outer surfaces of the turned-back portions, so that the right and left corners of the rear portion of the seat back can be formed square.

4 Claims, 3 Drawing Sheets

SEAT BACK REAR STRUCTURE

BACKGROUND OF THE INVENTION

1. Field of the Invention

The present invention relates to a seat back of an automotive seat and, more particularly, to a rear structure of the seat back in which a reinforcing rod member extended between the right and left portions in the lower portion of a frame provided in the seat back is formed in a rearwardly curved manner so as to increase the depth dimension of a seat cushion of the automotive seat.

2. Description of the Prior Art

Referring to FIGS. 1 to 3, there is illustrated an automotive seat (1) which includes a seat back designated by (2). To form the seat back (2), a reinforcing rod (4) which is curved rearwardly is provided so as to extend across the lower right and left portions of a frame (3) folded in an inverted U-shaped form, support members such as S-shaped springs are provided between the right and left side portions of the frame (3), a cushion member (10) formed of a foam material is applied to the front surface side of the frame (3), the ends of the cushion member (10) are turned back from the outer side surfaces of the frame (3) to the rear surface thereof, and all of the above-mentioned members are covered by a trim cover assembly (6) sewn in a bag-like shape. In these figures, reference numerals (14)(14) designate the turned-up or turned-back portions of the cushion member (10), respectively. As mentioned above, since the rearwardly curved reinforcing rod (4) is disposed in the lower portion of the frame (3), as shown in FIGS. 2 and 3, the depth dimension (L) of a seat cushion (5) can be increased.

Also, the turned-back portions (14)(14) of the cushion member (10) turned back to the rear surface of the frame (3), are folded back along the outside shape of the frame (3), and, in the portions where the reinforcing rod (4) is provided, it is folded back along the back surface of the reinforcing rod (4).

As mentioned above, the portions of the turned-back portions (14)(14) of the cushion member (10) where the reinforcing rod (4) is disposed provide round shapes since these portions are turned back along the curved form of the reinforcing rod (4), while the remaining portions thereof provide right-angle shapes since they are folded back along the frame (3). That is, the respective lower portions (a')(a') of the right and left corners of the rear section of the seat back (2) are formed round, and the respective upper corner portions are formed square.

Thus, in the above-mentioned conventional seat back rear structure, the shape of the rear structure of the seat back (2) lacks unity or coordination, and the trim cover assembly may produce wrinkles in the boundary portions thereof between the above-mentioned round and square-shaped corner portions, which can impair the appearance of the seat greatly.

SUMMARY OF THE INVENTION

The present invention aims at eliminating the drawbacks found in the above-mentioned prior art seat back rear structure.

Accordingly, it is an object of the invention to provide a seat back rear structure which can improve the appearance of the rear portion of a seat back which is provided with a curved reinforcing rod member to increase the depth dimension of a seat cushion of an automotive seat.

In order to accomplish this object, according to the invention, there is provided a seat back rear structure which comprises a turned-back or first portion formed by folding back the portions of a foam cushion member extending into the rear portion of the seat back from the outer side surfaces of a frame to the back surface thereof, and a thick shape holding or second portion formed in the same shape with the turned-back portion by folding back the cushion member over the rear surface of the reinforcing rod member to be covered by a trim cover assembly.

Therefore, the above-mentioned turned-back and shape holding portions are projected on the back surface side of the frame such that they form the same plane. That is, when these portions are covered with the trim cover assembly to assemble the seat back, then the corners of the rear-side lower as well as upper right and left portions of the seat back are made substantially square, which can improve the appearance of the rear portion of the seat back. Also, since no difference in level is produced between the turned-back and shape holding portions, there is eliminated the possibility that any wrinkles may be generated in the trim cover assembly.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF A PREFERRED EMBODIMENT OF THE INVENTION

Figure 1:
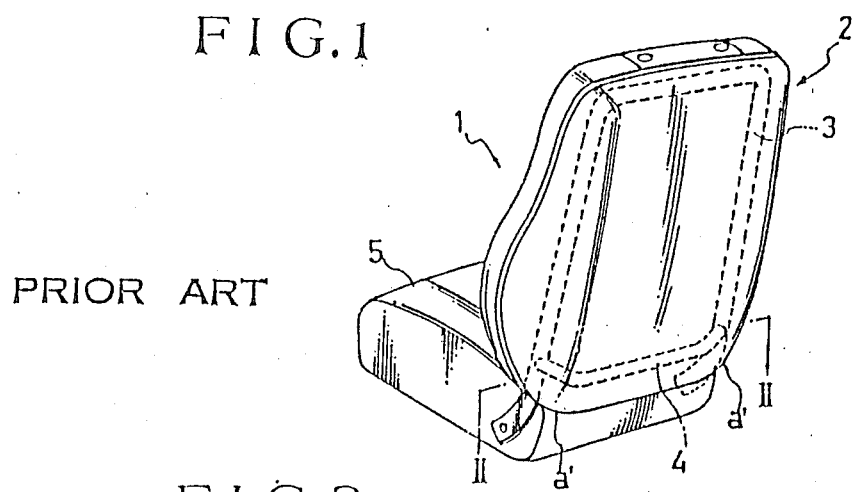
FIG. 1 is a perspective view of a conventional automotive seat.
Figure 2:
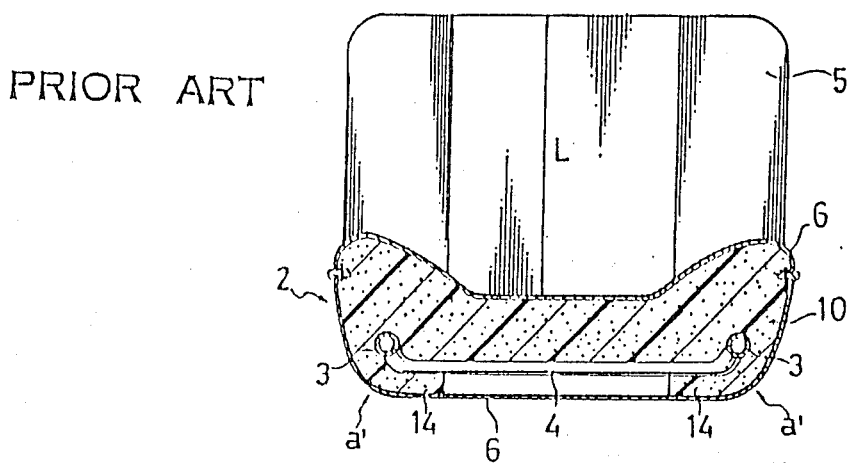
FIG. 2 is a section view taken along the line II—II in FIG. 1.
Figure 3:
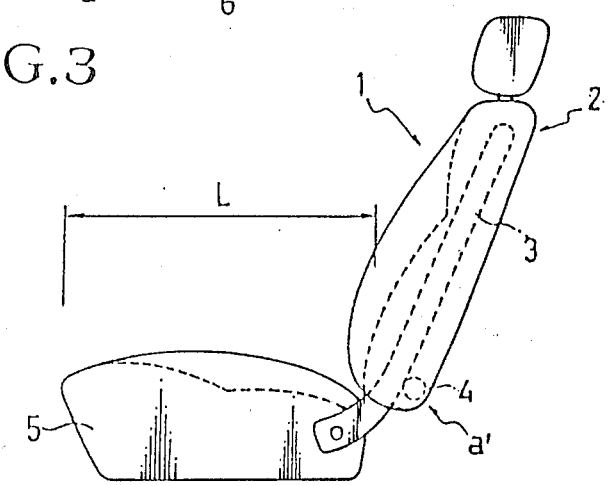
FIG. 3 is a side view of a conventional automotive seat.
Figure 4:
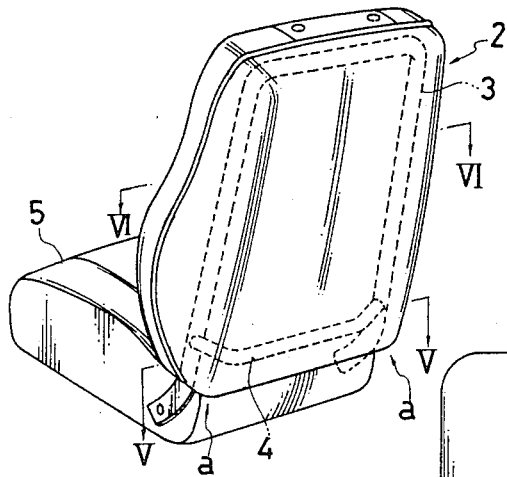
FIG. 4 is a perspective view of an automotive seat constructed in accordance with the present invention.
Figure 5:
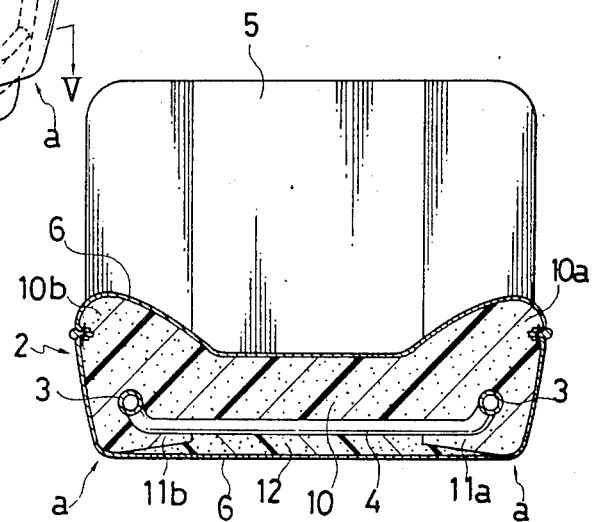
FIG. 5 is a section view taken along the line V—V in FIG. 4.

Referring first to FIG. 4, there is illustrated an automotive seat constructed in accordance with the present invention. The illustrated automotive seat comprises a seat back (2), in this seat (2), as in the above-mentioned conventional seat back, a reinforcing rod member (4), which is located in the lower portion of an inverted U-shaped frame (3), is curved rearwardly so as to increase the depth dimension (L) of a seat cushion (5), but the rearward corner portions (a)(a) of the seat back (2) corresponding to the portion of the frame (3) where the reinforcing rod (4) is disposed, as shown in FIG. 5, are formed substantially square.

Figure 6:
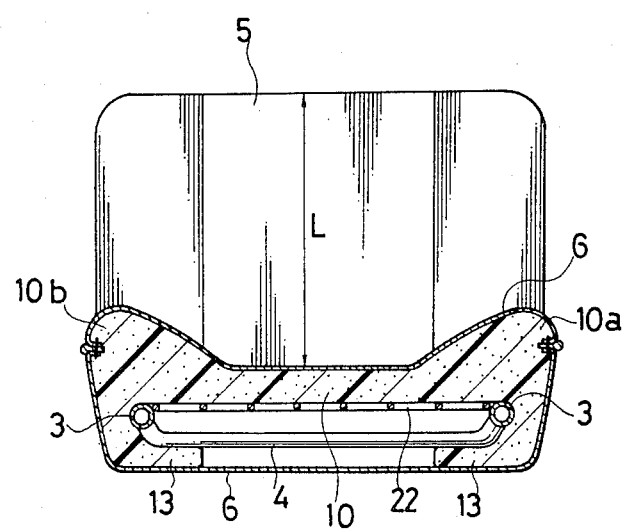
FIG. 6 is a section view taken along the line VI—VI in FIG. 4.

And, the square-shaped corner portions are formed so as to have the same outside shape with the portion of the seat back (2) located upwardly of the reinforcing rod (4) as shown in FIG. 6.

Figure 7:
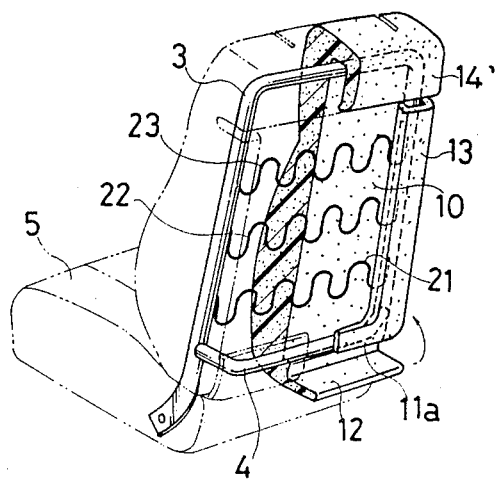
FIG. 7 is a perspective view of the automotive seat according to the invention before it is covered with a trim cover assembly; and, FIG. 8 is a partially cutaway perspective view of main portions of the seat back of the invention.
Figure 8:
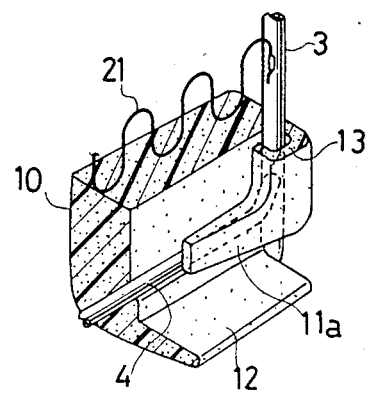

Referring now to FIGS. 7 and 8, there are illustrated perspective views of the seat back according to the invention in which a cushion member formed of a foam material (10) is mounted to the frame (3) and reinforcing rod (4). In this case, the frame (3) and reinforcing rod (4) are formed in the same manner as in the before-mentioned prior art seat back. That is, to form the frame (3), a pipe material is folded back in an inverted U-shaped configuration and then the two ends of the folded pipe are rotatably mounted to a frame (not shown) of the seat cushion (5) are mounted via a reclining device (not shown) after the ends are collapsed. Also, to form the reinforcing rod (4), a pipe material is folded in a curved shape and then the two ends of the curved pipe are welded to the frame (3). Further, the reinforcing rod (4) is welded in a backward direction. In the right and left of the frame (3) there are provided support members (21)(22)(23) comprising S-shaped springs arranged vertically in a multistage way.

The cushion member (10) comprises a foam material such as urethane foam and the like and is mold formed in a given shape. That is, in order to be able to provide the outside shape of the seat back (2), the cushion member (10) is provided on the right and left portions thereof with raised portions (10a)(10a) and, as a result of this, the central portion of the cushion member (10) is formed in a recess. The peripheral portions of the cushion member (10) are respectively turned back over the rear portions of the frame (3) and reinforcing rod (4) to provide turned-back portions (11a)(12)(13) (14') integrally.

The turned-back portions (11a)(12) that are turned back over the rear surface of the reinforcing rod (4) are here referred to as "shape holding portions or second portions", respectively, while other remaining portions are called "turned-back portions" simply, respectively, that is, (13) and (14') are simply called turned-back portions or first portions.

Both the turned-back portion (14') covering the upper rear surface of the frame (3) and the turned-back portion (13) covering the right and left rear surface portions of the frame (3) are formed in a substantially J-shaped configuration so as to be able to embrace the frame (3) therein. And, the rear surface portion and outer side surface portions of the frame (3) are formed so as to be substantially equal to each other in thickness.

The shape holding portion (11a) is formed such that it can be folded back from the welded portion of the reinforcing rod (4) to the frame (3) over the rear surface of the curved portion of the reinforcing rod (4) and also that it is integral with the above-mentioned turned-back portion (13). The portion of the shape holding portion (11a) where the reinforcing rod is welded to the frame (3) is formed thick. That is, such portion is formed so as to be able to form the almost same plane with the outside surface of the turned-back portion (13) and to form the lower corner portions (a) and (a) substantially square in the depth diversion (L) of the seat cushion (5).

The shape holding portion (12) is provided at the lower end of the cushion member (10) to extend in a tongue-like shape. This portion (12) is formed such that it mainly covers the linear portion of the reinforcing rod (4) and also it can envelop the reinforcing rod (4) from the lower portion thereof to the rear surface portion thereof.

However, it should be noted that the last-mentioned shape holding portion (12) is not always necessary. That is, when the end of the above-mentioned shape holding portion (11a) is extended further in the direction of the linear portion of the reinforcing rod (4), then the extended portion of the shape holding portion (11a) provides substantially the same shape with the shape holding portion (12), which eliminates the need of the shape holding portion (12).

Now, the cushion member (10) provided with the above-mentioned turned-back portions (13)(14') and shape holding poritons (11a)(12) mounted to the frame (3) and reinforcing rod (4) is then covered with a trim cover assembly (6) sewn in a bag-like shape, so that the seat back (2) is assembled. The bag-like trim cover assembly (6) has an opening which can be closed by the lower portion of the cushion member (10) disposed on the side of the seat cushion (5).

As has been described heretofore, according to the invention, since the thick shape holding portion (11a) is provided in the welded portions of the curved reinforcing rod and the outer surface of the shape holding portion (11a) is formed so as to form the same plane with the outer surface of the turned-back portion (13), there is eliminated the possibility that there may be produced any differences in level in the rear surface of the seat back. Also, since the right and left corners on the rear surface of the seat back are generally formed square, it is possible to provide a seat back which is improved in appearance over the above-mentioned prior art seat back.

What is claimed is:

1. A rear structure of a seat back in which a rearwardly curved reinforcing rod member is provided so as to extend between the lower right and left ends of a frame curved in an inverted U-shaped configuration, support members are provided on the right and left of said frame, and cushion member formed of a foam material is applied against said support members, said cushion member being covered by a trim cover assembly which extends the distance from the lower portion of said seat back to the front portion thereof so as to increase the depth dimension of said seat cushion, characterized in that said seat cushion is provided with first and second portions at the outer sides thereof; wherein said first portions extend rearwardly from said seat cushion at the outer side surface of said frame and has ends which are folded over to contact said frame to form a back surface of said seat back; said second portions extend rearwardly from said seat cushion in the area of said reinforcing rod member and have ends which are folded over to contact the rear surface of said reinforcing rod member; and the said second portions being formed thick in said depth dimension around said rearwardly curved reinforcing rod member thereby forming a planar surface with said first portions being the back surface of said seat back.

2. A rear structure of a seat back as set forth in claim 1, wherein said second portions are formed integrally with said cushion member and are folded around said outer side surfaces of said frame at the area of said reinforcing rod member as well as extending from the bottom of said reinforcing rod member and being folded over to contact said rear surface of said reinforcing rod member.

3. A rear structure of a seat back as set forth in claim 1, wherein said second portions are formed as flaps which are folded to contact and cover the rear portions of said frame and said reinforcing rod member.

4. A rear structure of a seat back as set forth in claim 1, wherein said first and second portions are formed integrally with said seat cushion.

* * * * *